US008712727B2

(12) United States Patent
Girardey et al.

(10) Patent No.: US 8,712,727 B2
(45) Date of Patent: Apr. 29, 2014

(54) FIELD DEVICE FOR DETERMINING OR MONITORING A PHYSICAL OR CHEMICAL PROCESS VARIABLE

(75) Inventors: Romuald Girardey, Huningue (FR); Michael Hübner, Karlsruhe (DE); Dietmar Frühauf, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 318 days.

(21) Appl. No.: 12/923,108

(22) Filed: Sep. 2, 2010

(65) Prior Publication Data
US 2011/0087460 A1    Apr. 14, 2011

(30) Foreign Application Priority Data

Oct. 12, 2009  (DE) .......................... 10 2009 049 159
Feb. 25, 2010  (DE) .......................... 10 2010 002 346

(51) Int. Cl.
   *G06F 11/30*    (2006.01)
(52) U.S. Cl.
   USPC .............................. 702/182; 702/58; 702/117
(58) Field of Classification Search
   USPC .................. 702/57–59, 117, 118, 182; 326/41
   See application file for complete search history.

(56) References Cited

U.S. PATENT DOCUMENTS

| 6,160,418 A * | 12/2000 | Burnham ........................ 326/38 |
| 2009/0128189 A1* | 5/2009 | Madurawe et al. ............. 326/41 |
| 2011/0054637 A1 | 3/2011 | Girardey et al. |

FOREIGN PATENT DOCUMENTS

| DE | 10 2007 054 672 | 5/2009 |
| WO | WO 00/36492 | 6/2000 |
| WO | WO 2009/062954 | 5/2009 |
| WO | WO 2009/155993 | 12/2009 |
| WO | WO 2011/023469 | 3/2011 |

OTHER PUBLICATIONS

Romuald Girardey, Dynamic Reconfigurable Mixed-Signal Architecture for Safety Critical Applications, IEEE FPL 2009.*
Ted Huffmire, Moats and Drawbridges: An Isolation Primitive for Reconfigurable Hardware Based Systems, IEEE Symposium, 2007.*
Great Britain Search Report.

* cited by examiner

*Primary Examiner* — Sujoy Kundu
*Assistant Examiner* — Harun Chowdhury
(74) *Attorney, Agent, or Firm* — Bacon & Thomas, PLLC

(57) ABSTRACT

A field device is composed of a sensor, which works according to a defined measuring principle, and a control/evaluation unit, for a particular safety-critical application, conditions and evaluates, along at least two equivalent measuring paths, measurement data delivered by the sensor. The control/evaluation unit is implemented on an FPGA, provided with at least a first section and a second section. In each section, a digital measuring path, is dynamically reconfigurable. The sections are isolated from one another by permanently configured spacer regions, wherein the spacer regions are embodied in such a way, that a temperature and/or a voltage change in one of the sections has no influence on the other section or other sections, and, in the case of malfunction, no connection occurs between the sections. The control/evaluation unit, as a function of the particular defined safety-critical application, partially dynamically reconfigures the function modules in the measuring paths in such a manner, that the field device fulfills the required safety standard.

11 Claims, 4 Drawing Sheets

FIELD DEVICE FOR DETERMINING OR MONITORING A PHYSICAL OR CHEMICAL PROCESS VARIABLE

TECHNICAL FIELD

The invention relates to a field device for determining or monitoring a physical or chemical, process variable, wherein the field device is composed of a sensor, which works according to a defined measuring principle, and a control/evaluation unit, which, as a function of a safety standard required in the particular safety-critical application, conditions and evaluates, along at least two equivalent measuring paths, the measurement data delivered by the sensor. Preferably, the field device is used in automation technology, especially in process and manufacturing automation.

BACKGROUND DISCUSSION

In WO 2004/013585 A1, concerns an embodiment of a field device, which can be used in safety-critical applications in the field of process automation. The invention is not, however, limited to the field of process and manufacturing automation, but can also be applied in safety-critical applications in automobile sector, etc.

In automation technology, especially in process automation technology, field devices are used, which serve to determine and monitor process variables. Examples of such field devices are fill level measuring devices, flow measuring devices, analytical measuring devices, pressure and temperature measuring devices, humidity and conductivity measuring devices, and density and viscosity measuring devices. The sensors of these field devices register the corresponding process variables, e.g. fill level, flow, pH-value, substance concentration, pressure, temperature, humidity, conductivity, density or viscosity.

Also subsumed under the term "field devices" are, however, actuators (e.g. valves or pumps), via which, for example, the flow of a liquid in a pipeline or the fill level in a container is changeable. A large number of such field devices are available from members of the firm Endress+Hauser.

In modern automation technology plants, as well as in the automobile sector, field devices are, as a rule, connected over communication networks (such as HART-multidrop, point to point connection, Profibus, Foundation Fieldbus or CAN-Bus) with a superordinated unit, which is referred to as a control system or superordinated control unit. This superordinated unit is used for control, diagnosis, visualizing, and monitoring functions as well as in the start-up and servicing of field devices. Additional components which are necessary for operation of fieldbus systems and connected directly to a fieldbus (especially components used for communication with the superordinated units) are likewise frequently referred to as field devices. These supplemental components are, for example, remote I/Os, gateways, linking devices, controllers or wireless adapters. These are also subsumed under the term "field devices".

The software component of field devices is constantly increasing. The advantage of the use of microcontroller-controlled intelligent field devices (smart field devices) lies in the fact that, via application-specific software programs, a plurality of different functionalities can be implemented in a field device; thus, program changes can be performed relatively easily. The high flexibility of program-controlled field devices is, on the other hand, countered by a relatively low processing speed (and therewith a correspondingly low measuring rate) as a result of the sequential progression through the program.

In order to increase the processing speed, ASICs (Application Specific Integrated Circuits) are, whenever economically justified, applied in field devices. Through the application-specific configuration, these chips can process data and signals substantially faster than a software program can. ASICs, are, consequently, especially excellently suitable for computationally intensive applications.

A disadvantage in the application of ASICs is the fact that the functionality of these chips is firmly predetermined. A subsequent change in functionality is not readily possible in such case. Furthermore, the use of ASICs is only worthwhile in the case of a relatively large number of pieces, since the developmental effort and the therewith connected costs are high.

In order to avoid the drawbacks of the firmly predetermined functionality, in WO 03/098154 A1, a configurable field device is described, in the case of which a reconfigurable logic chip in the form of an FPGA (Field-Programmable Gate Array) is provided. In this known solution, the logic chip, which has at least one microcontroller (which is also referred to as an embedded controller), is configured at system start. After the configuration is finished, the required software is loaded into the microcontroller. The reconfigurable logic chip required in such case must have at its disposal sufficient resources (particularly logic, wiring and memory resources) to fulfill the desired functionalities. Logic chips with many resources require a great deal of energy, which, in turn, from a functional point of view, makes use thereof in automation possible only to a limited degree. A disadvantage of using logic chips with few resources (and, thus, with a smaller energy consumption) is the considerable limitation in the functionality of the corresponding field device.

Depending on the particular application, the field devices must satisfy a most varied range of safety requirements. In order to satisfy the particular safety requirements (e.g. the SIL-standard "security integrity level", which plays a large roll in process automation), the functionality of the field devices must be fashioned in a redundant and/or diverse manner.

Redundance, or redundancy, means increased safety through doubled or plural design of all safety-relevant hardware and software components. Diversity means that the hardware components (e.g. microprocessors or A/D converters) located in the various measuring paths come from different manufacturers and/or are of different types. In the case of software-components, diversity requires that the software stored in the microprocessors originates from different sources, e.g. comes from different companies, or different programmers, as the case may be. Through all these measures, it should be assured that a safety-critical failure of the field device, as well as the occurrence of simultaneously arising systematic errors in the provision of measured values, are excluded with a high probability. It is also known additionally to design individual essential hardware and software components of the evaluating circuit in a redundant and/or diverse manner. Through redundant and diverse design of individual hardware and software components, the degree of safety can be further increased.

An example of a safety-relevant application is fill-level monitoring in a tank in which a burnable or explosive liquid—or also a liquid which is not burnable, but instead presents a hazard to the environment—is stored. Here, it must be assured that the supply of liquid to the tank is immediately interrupted as soon as a maximum reliable fill level is reached.

This, in turn, presupposes that the measuring device detects the fill level with a high reliability, and that the measuring device works faultlessly.

In WO 2009/062954 A1, a field device is described, which has a sensor functioning according to a defined measuring principle. Also present is a control/evaluation unit, which, as a function of a safety standard required for the particular safety-critical application, conditions and evaluates, along at least two equal-valued measuring paths, the measurement data delivered by the sensor. The control/evaluation unit is at least partially embodied as a reconfigurable logic chip having a plurality of partially dynamically reconfigurable function modules. In each case, the control/evaluation unit configures the function modules in the measuring paths as a function of the particular defined safety-critical application, and does so in such a manner, that the field device is designed according to the required safety standard.

Problematic in the case of the known embodiment is the fact that a malfunction (e.g. a short circuit or a temperature change) in one section automatically influences other sections. Crosstalk onto other sections takes place, meaning that the field device could deliver defective measurement results, and thus no longer works reliably. This presents a high risk, especially in safety-critical applications, a situation which is not acceptable.

SUMMARY OF THE INVENTION

An object of the invention is to provide a highly flexible field device for safety-critical applications.

The object is achieved by the features that the control/evaluation unit is implemented on an FPGA, on which at least a first section and a second section are provided, wherein, in each section, a digital measuring path, which is composed of a plurality of software-based and/or hardware based function modules, is partially dynamically reconfigurable; wherein the individual sections are isolated from one another by permanently configured spacer regions or forbidden regions; wherein the spacer regions are embodied in such a manner, that a temperature change and/or a voltage change in one of the sections has no influence on the other section or the other sections, and, in the case of a malfunction, no connection occurs between the sections; and wherein the control/evaluation unit partially dynamically reconfigures the function modules in the measuring paths as a function of the particular defined safety-critical application, so that the field device fulfills the required safety standard. "Partially dynamically reconfigurable" means, in such case, that function modules of the FPGA are reconfigured in the corresponding measuring path during runtime, thus dynamically. The malfunction is brought about, for example, by incoming gamma or cosmic radiation, that is high-energy radiation, which changes or renders inoperable the function of one or more logic components or other resources.

In an advantageous embodiment of the field device of the invention, it is provided that the dimensioning of the spacer regions installed for potential isolation is selected as a function of the structure of the FPGA. In this way, it is possible to utilize FPGAs already present on the market. The structure of the FPGA is ultimately determined especially by the dimensioning of the wiring between the logic components (CLB—configurable logic block, configurable logic blocks) and by the dimensioning of the logic components (CLB) of the FPGA. In order to prevent an influencing of any sort whatsoever between neighboring sections, the dimensioning/width which is at least to be maintained for the spacer regions is preferably given as a multiple of the dimensioning of the logic components of the particular FPGA used. In such case, the wiring patterns of the CLB also play a roll. The minimal distance between the sections or the width of the spacer regions is selected in such a way, that short circuits or crosstalk between the sections are excluded. Furthermore, the spacer regions serve for thermal decoupling of the sections.

An advantageous further development of the field device of the invention provides that the logic components arranged in each of the spacer regions, as well as the corresponding wiring—that is to say, the resources—are grounded.

Furthermore, in the case, in which the FPGA has global lines/wiring or long lines/wiring which extend across at least two sections, it is provided that these global or long lines are blocked, or grounded.

Moreover, an advantageous further development of the field device of the invention provides that the division of the FPGA into individual sections is performed in such a way, that the resources present on the FPGA which are required for execution of functions by the function modules in the respective sections are also present in each of these sections. As can be seen in FIG. 3, this requires a corresponding division of the available area on the FPGA into sections, since the resources themselves are firmly predetermined on the FPGA, if the FPGA is a standard FPGA. The resources are especially logic, wiring and memory resources, as well as the so-called DCM (Digital Clock Manager), which gives the clock signal for the logic components of the FPGA.

A preferred embodiment of the field device of the invention provides that the measuring paths with the dynamically reconfigurable function modules are designed redundantly, diversely or redundantly and diversely.

Furthermore, it is provided that a voter, or a microcontroller, which is likewise isolated from the neighboring measuring paths by spacer regions, is associated with the control/evaluation unit. The voter, or the microcontroller, compares the measurement data (which are made available from or in the measuring paths and correspond with one another) with one another, and, in the case of a deviation, generates a warning or error report, or suitable repair mechanisms are accessed.

If the voter or the microcontroller serially or parallelly partially dynamically reconfigures the function modules for an uneven number of redundant and or diverse measuring paths, it is then possible that the voter, or the microcontroller, by comparison of the measurement data made available in or from the measuring paths, detects which measuring path is delivering defective measurement data. In turn, a corresponding warning report can be generated. Moreover, it is, of course, possible—especially in the case of this embodiment—to engineer, with targeting, suitable healing methods in the relevant measuring path. These repair and healing mechanisms are described at length in the not-yet-published DE 10 2009 028938.0, filed on Aug. 27, 2009. Corresponding mechanisms can also be found, however, in the published DE 10 2007 054 672 A1. The corresponding disclosure is expressly incorporated by reference into the disclosure of the present patent application.

It is seen as particularly advantageous in connection with the present invention, when at least one of the measuring paths is configured hardware-based as an FPAA in a section the FPGA, independently of the FPGA used.

Moreover, it is provided that, on a selected section of the FPGA which is isolated from the neighboring sections by spacer regions, a static region is provided, in which is permanently configured at least one function module, in which runs the control program for configuring the function modules which are to be dynamically configured in the individual sections. The voter and/or the microcontroller is especially to be found in this selected section.

An advantageous embodiment of the field device of the invention provides communication lines, which are arranged outside of the FPGA, between the individual sections. These communication lines are responsible for information exchange between the measuring paths and/or between the individual measuring paths and the voter or microcontroller. In order to assure that only a limited energy or power supply can reach the sections via these communication lines, at least one limiting device is preferably associated with each of the communication lines. It is very important that the energy and power supply between the measuring paths via the communication lines is limited. Only in such a way is it assured that errors which have a shared cause (Common Cause Failures) can be prevented. The same is true also in reference to the spacer regions or the forbidden regions.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
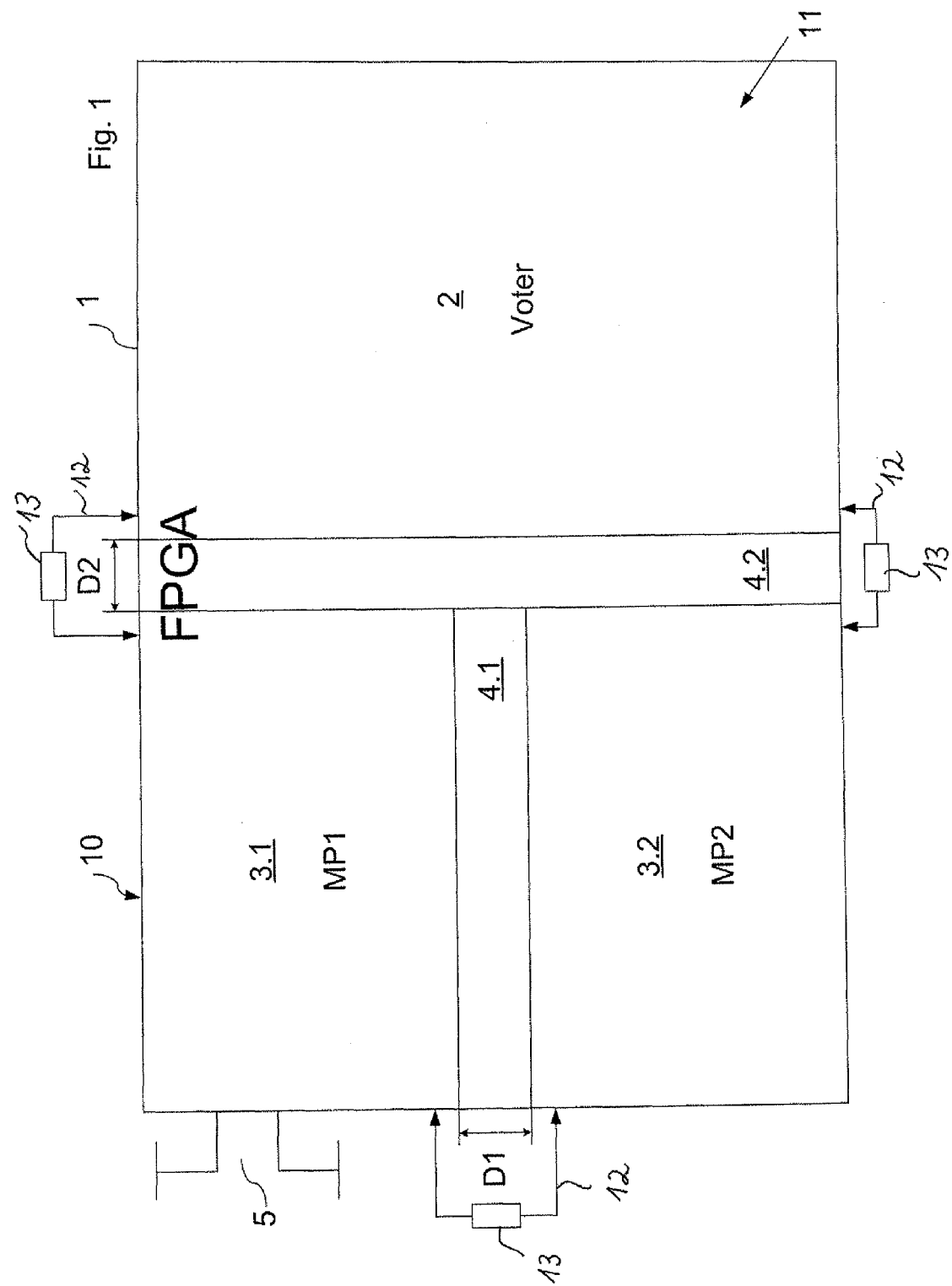
FIG. 1 is a schematic representation of the field device of the invention.

FIG. 1 shows a schematic representation of the control/evaluation unit 10 of the field device of the invention, with two sections 3.1, 3.2, in which, in each case, a digital measuring path MP1, MP2 is partially dynamically reconfigurable. The field device itself is not separately presented in the Figs. Field devices of the most varied of types are available from the Endress+Hauser group.

Each of the two equivalent measuring paths MP1, MP2 is composed of one or a plurality of software-based and/or hardware-based function modules, which are likewise not separately presented in FIG. 1. The control/evaluation unit 10 is implemented on an FPGA 1. Preferably, a standard FPGA 1 is used as a basis for the solution of the invention. The two measuring paths MP1, MP2 are—depending on required safety standard—redundantly and/or diversely designed. The required function modules are, according to need, partially dynamically reconfigured in the measuring paths MP1, MP2. An advantage of this partial dynamic reconfiguration is the relatively small size of the FPGA, on which the function modules are configured in the measuring paths MP1, MP2.

In order to avoid that a malfunction in a section 3.1 has an influence on the neighboring section 3.2, the two measuring paths MP1, MP2 are spaced apart from one another. The distance between the measuring paths MP1, MP2 or the two sections 3.1, 3.2 is identified in FIG. 1 with D1. The distance D1 between two neighboring sections 3.1, 3.2—and likewise the distance D2 between the two sections 3.1, 3.2 and the voter 2—is usually dependent on the particular structure of the FPGA 1, on which the control/evaluation unit 10 is implemented. Furthermore, it is provided that the distances D1, D2 between neighboring sections 3.1, 3.2, 2 is a number of times larger than the size of the logic blocks (CLB), from which the FPGA 1 is constructed.

On this basis there can especially be defined an optimum distance D, which two adjoining sections 3.1, 3.2, 2 must have from one another, in order that the occurrence of a malfunction in a section 3.1 or in a measuring path MP1 does not influence the other section 3.2 or 2 or the other measuring path MP2. In order to detect whether a temperature change occurs, it is seen as advantageous, when a temperature measurement is implemented in each measuring path MP1, MP2.

Between the sections 3.1, 3.2, 2 are located the spacer regions 4.1, 4.2, for the purpose of potential isolation. These spacer regions 4.1, 4.2 are permanently configured and are embodied or dimensioned in such a way, that a temperature and/or a voltage change in one of the sections 3.1, 3.2, 2 has no influence on the other section (or the other sections), and that, in the case of a malfunction, no electrical or thermal connection occurs between the sections 3.1, 3.2, 2. Crosstalk between the sections 3.1, 3.2, 2 is effectively prevented by the spacer regions 4.1, 4.2.

As already mentioned, the dimensioning of the spacer regions 4.1, 4.2 (which are installed for potential isolation) is preferably dependent on the particular structure of the FPGA 1. The structure of the FPGA 1 is, on a lower level, especially determined by the dimensioning of the wiring, but also, however, by the dimensioning of the logic components CLB (Configurable Logic Blocks) of the particular FPGA 1 used. The potential isolation is thereby achieved by the fact that the logic components CLB, 7, 9 located in each of the spacer regions 4.1, 4.2, as well as the corresponding wiring 8 between the logic components CLB, 7, 9, are grounded. Preferably, a standard FPGA 1 is employed in connection with the invention.

While the function modules in the sections 3.1, 3.2 of the FPGA 1 are partially dynamically reconfigurable, the voter 2 is permanently configured in a static region of the FPGA 1.

Communication between the measuring paths MP1, MP2, and between the measuring paths MP1, MP2 and the voter 2 (or the microcontroller) occurs via communication lines 12, which extend outside of the FPGA 1. In order to assure that only a limited supplying of energy or power occurs via these communication lines 12, at least one limiting device 13 is preferably installed in each of the communication lines 12.

Figure 2:
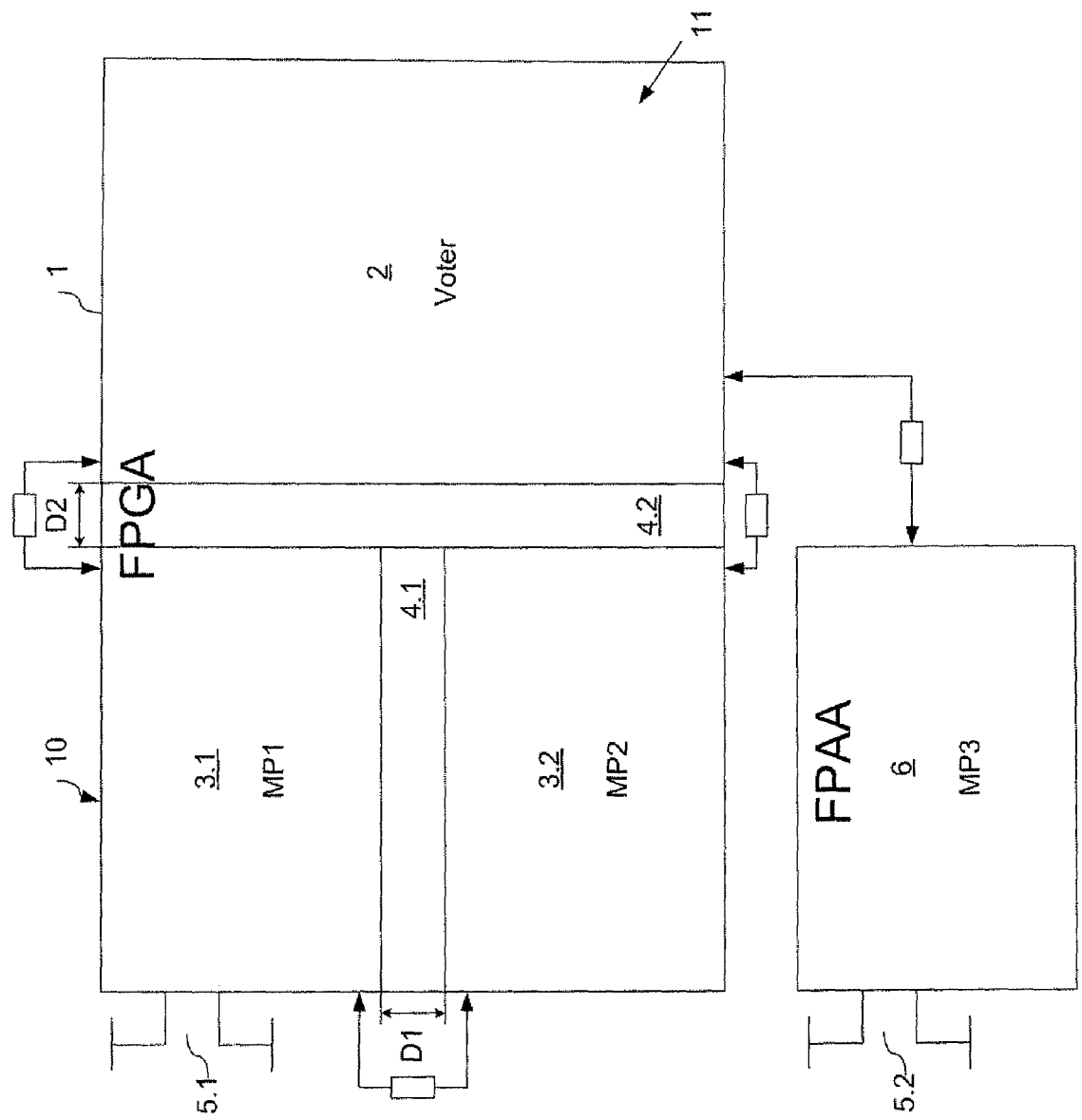
FIG. 2 is an embodiment of the solution of the invention with three measuring paths.

The embodiment shown in FIG. 2 differs from the embodiment illustrated in FIG. 1 in that, in addition to the sections 3.1, 3.2, in which the measuring paths MP1, MP2 are partially dynamically reconfigurable, a further measuring path MP3 is provided. The measuring path MP3 is configured, analog-based, on a FPAA 6, and is thus implemented independently of the standard FPGA 1. "Analog-based" means, in such case, that in a FPAA, for example, a measuring path is configured dynamically—thus during runtime, i.e., while the field device is executing its intended function. Through the third measuring path MP3, an increased redundancy and/or diversity can be achieved. In the case of the triply designed measuring paths MP1, MP2, MP3, as well as in the case of any uneven number of measuring paths, it can especially be ascertained which of the measuring paths MP1, MP2, MP3, in given cases, is working incorrectly.

Figure 3:
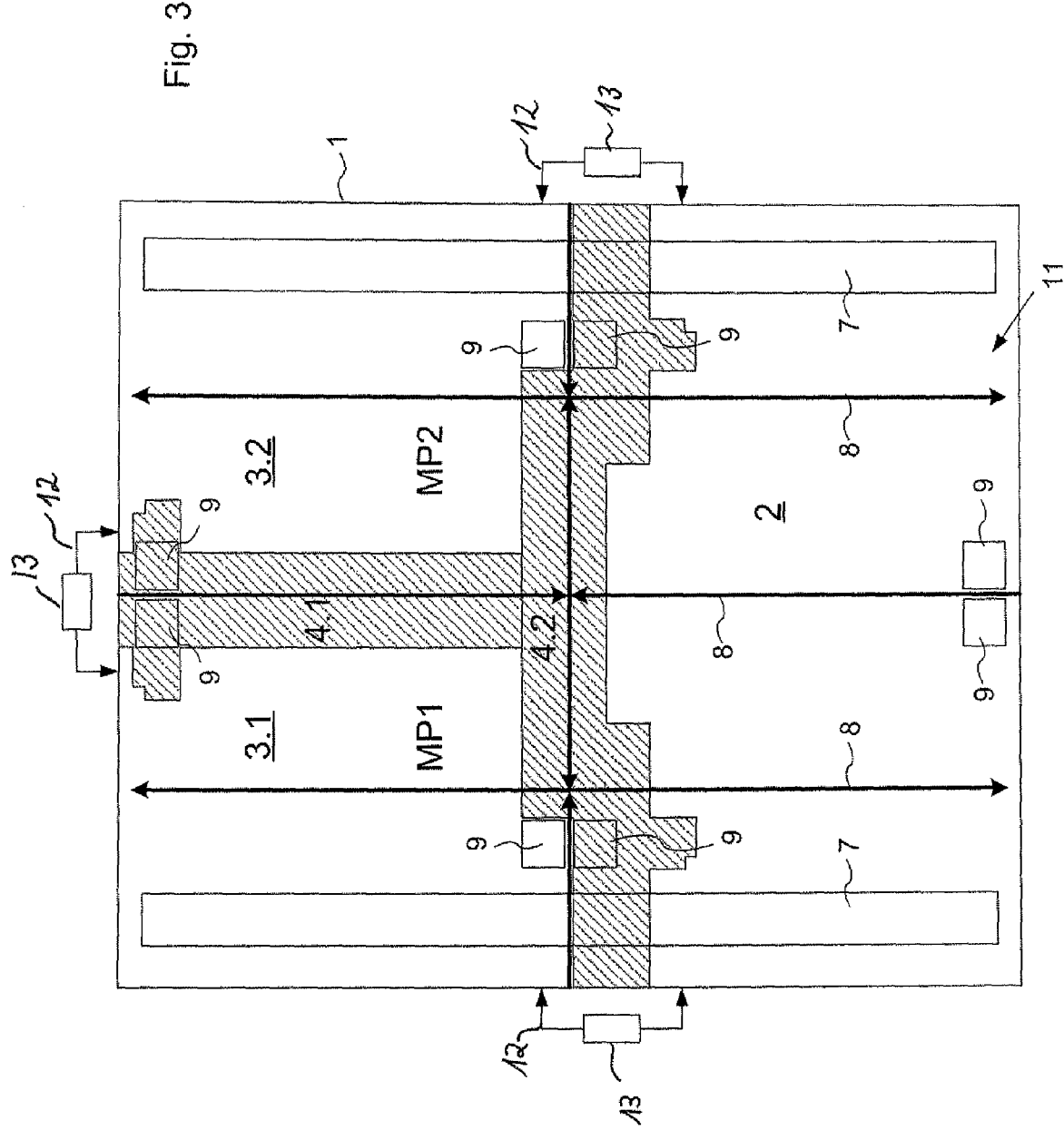
FIG. 3 is a preferred embodiment of the solution of the invention.
Figure 4:
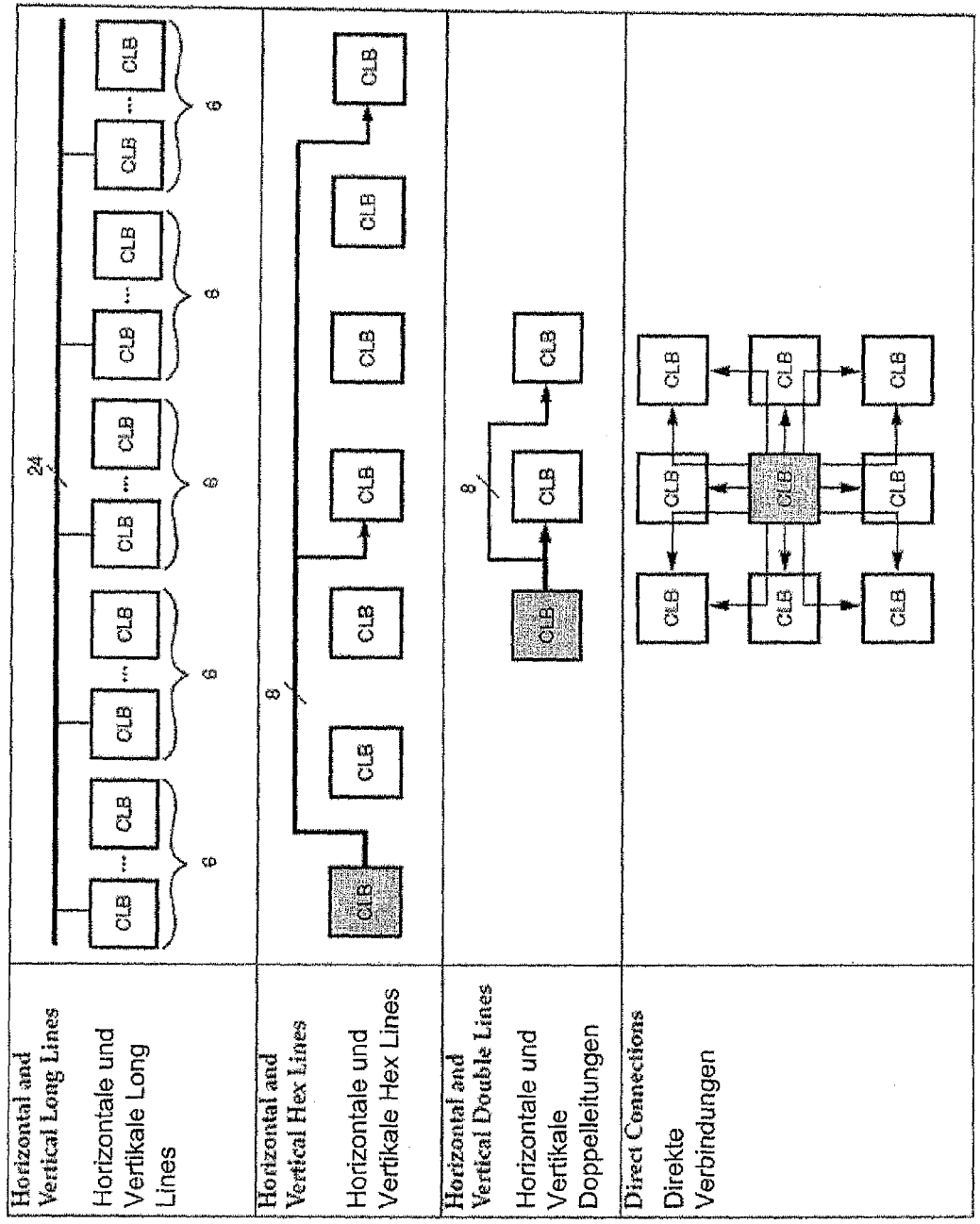
FIG. 4 is a schematic representation of the logic resources of an FPGA.

FIG. 3 shows a preferred embodiment of the control/evaluation unit 1 of the invention. In the case of this embodiment, the division of the FPGA 1 into individual sections 3.1, 3.2, 2 is performed in such a way, that resources CBL, 7, 8, 9 present on the FPGA 1, which are necessary for the execution of functions by the function modules in the respective sections 3.1, 3.2, 2, are present in each of these sections 3.1, 3.2, 2. The resources are the logic components CBL, the memory chips 7 (which, for example, are embodied as RAM), and the so-called Digital Clock Manager DCM 9, of which, in each case, at least one must be arranged in each section 3.1, 3.2, 2. Furthermore, the resources include the wiring 8, of which the so-called Global Lines are shown in FIG. 3. The Global Lines bring the clock signal from the DCMs to the CLBs. Besides the Global Lines, which can extend across a number of sections, there are also the Long Lines. While the Global Lines relay the clock signals, the Long Lines serve for transfer of other signals. A detailed representation the wiring at the level of the logic components can be seen in FIG. 4. Other details can be found in the article "Sicherheitsbewusstes Place and Route für In-Chip Redundanz in sicherheitskritischen Anwendung", (Safety-Aware Place and Route for In-Chip Redundance in Safety-Critical Application), whose priority is claimed for the present application. The corresponding disclosure of this article is to be added to the disclosure of the present patent application. For an FPGA, which can be utilized in connection with the field device of the invention, the FPGA Spartan 3E or 3A, for example, is named in the article.

As already mentioned earlier, the logic components CLB and the wiring in the spacer regions 4.1, 4.2 are grounded. The same is true for the Digital Clock Managers 9 located in the spacer regions 4.1, 4.2. However, as is to be seen in FIG. 3, the spacer regions 4.1, 4.2 are embodied in such a way, that it is assured that at least one digital Clock Manager 9 is operative in each section 3.1, 3.2, since otherwise the measuring paths MP1, MP2 would receive no clock signal.

It should be pointed out that the disclosure of the paper "Sicherheitsbewusstes Place and Route für In-Chip Redundanz in sicherheitskritischen Applikationen", (Safety-Aware Place and Route for In-Chip Redundance in Safety-Critical Applications), whose priority is claimed by the present patent application, is explicitly to be added to the disclosure of the present patent application.

The invention claimed is:

1. A field device for determining or monitoring a physical or chemical process variable, comprising:
a sensor, which works according to a defined measuring principle; and a control/evaluation unit, which, as a function of a safety standard required for a particular safety-critical application, conditions and evaluates, along at least two equivalent digital measuring paths, measurement data delivered by the sensor, wherein:
said control/evaluation unit is implemented on an FPGA 1, on which are provided at least a first section and a second section, in each section, a digital measuring path, which is composed of a plurality of software-based and/or hardware-based function modules, is dynamically reconfigurable;
the FPGA 1 has global lines and long lines, which extend across at least two of said individual sections, and which are blocked and grounded,
the individual sections are isolated from one another by permanently configured spacer regions, said spacer regions are embodied in such a way, that a temperature and/or a voltage change in one of said digital measuring paths has no safety-critical influence on the other section of said digital measuring paths, and, in the case of safety-critical malfunction, no electrical connection occurs between said sections; and
said control/evaluation unit, as a function of the particular defined safety-critical application, partially dynamically reconfigures the function modules in said measuring paths, so that the field device fulfills the required safety standard.

2. The field device as claimed in claim 1, wherein:
the FPGA 1 includes logic components; and
dimensioning of the spacer regions installed for purposes of potential isolation is dependent on the spacing of said logic components of the FPGA 1.

3. The field device as claimed in claim 1, further comprising:
logic components arranged in each of said permanently configured spacer regions, as well as corresponding wiring, are grounded.

4. The field device as claimed in claim 3, wherein:
division of the FPGA 1 into individual sections is performed in such a way, that said logic components present on the FPGA 1, which are necessary for execution of functions by the function modules in the respective individual sections, are present in each of these individual sections.

5. The field device as claimed in claim 1, wherein:
said digital measuring paths with the dynamically reconfigurable function modules are designed redundantly, diversely or redundantly and diversely.

6. The field device as claimed in claim 1, wherein:
associated with said control/evaluation unit is a voter or a microcontroller, which is likewise isolated from the neighboring digital measuring paths by spacer regions, and which compares the measurement data (which are made available by or in said digital measuring paths and which correspond with one another) with one another, and, in case of a deviation, generates a warning or error report.

7. The field device as claimed in claim 6, wherein:
said voter or said microcontroller serially or parallelly partially dynamically reconfigures the function modules for an uneven number of redundant and or diverse digital measuring paths;
said voter or said microcontroller compares measurement data made available by or in said digital measuring paths with one another; and
said voter or said microcontroller generates a warning report stating that a defined digital measuring path is delivering defective data, if, on the defined digital measuring path, measurement data are made available which deviate from measurement data of the remaining digital measuring paths.

8. The field device as claimed in claim 1, wherein:
at least one of said digital measuring paths is configured in an FPAA in an analog-based manner.

9. The field device as claimed in claim 1, wherein:
on a selected section of the FPGA 1, which is isolated from said neighboring sections by said spacer regions, a static region is provided, in which is permanently configured at least one function module, in which runs a control program for configuring function modules which are to be dynamically configured in said individual sections.

10. The field device as claimed in claim 1, wherein:
communication lines are provided, which are arranged outside of the FPGA 1, between said individual sections.

11. The field device as claimed in claim 10, wherein:
at least one limiting device for limiting voltage and/or electrical current between said individual sections is provided in the individual communication lines.

* * * * *